United States Patent
Lundgren

[19]

[11] Patent Number: 6,112,965
[45] Date of Patent: Sep. 5, 2000

[54] RAILING BRACKET

[75] Inventor: Anders Lundgren, GrimsÅs, Sweden

[73] Assignee: Industri AB Thule, Hillerstorp, Sweden

[21] Appl. No.: 09/264,397

[22] Filed: Mar. 8, 1999

Related U.S. Application Data

[63] Continuation of application No. PCT/SE97/01414, Aug. 27, 1997.

[30] Foreign Application Priority Data

Sep. 10, 1996 [SE] Sweden ................................. 96032696

[51] Int. Cl.[7] ........................................................ B60R 9/00
[52] U.S. Cl. ............................ 224/322; 224/329; 224/331
[58] Field of Search ..................................... 224/329, 330, 224/331, 323, 319, 321, 322; 248/230.3, 231.4, 229.22

[56] References Cited

U.S. PATENT DOCUMENTS

| | | | |
|---|---|---|---|
| 4,640,450 | 2/1987 | Gallion et al. ............................ | 224/331 |
| 5,104,020 | 4/1992 | Arvidsson et al. . | |
| 5,257,710 | 11/1993 | Cropley .................................... | 224/331 |
| 5,275,320 | 1/1994 | Duemmler . | |
| 5,397,042 | 3/1995 | Pedrini ..................................... | 224/329 |
| 5,806,735 | 9/1998 | Christiansson et al. ................. | 224/322 |

FOREIGN PATENT DOCUMENTS

| | | | |
|---|---|---|---|
| 0487132 | 5/1992 | European Pat. Off. . | |
| 0503305 | 9/1992 | European Pat. Off. . | |
| 0623490A2 | 9/1994 | Germany ............................... | 224/331 |
| 8904775 | 6/1989 | WIPO . | |
| 9421490 | 9/1994 | WIPO . | |
| 9624509 | 8/1996 | WIPO . | |

OTHER PUBLICATIONS

International Search Report for PCT/SE 97/0141 dated Oct. 9, 1997.
International Preliminary Examination Report for PCT/SE97/01414 dated Dec. 1, 1998.

*Primary Examiner*—Gregory M. Vidovich
*Assistant Examiner*—Maerena W. Brevard
*Attorney, Agent, or Firm*—Royston, Rayzor, Vickery, Novak & Druce, L.L.P.

[57] ABSTRACT

An apparatus or bracket for securing a load carrier strut that extends transversely over a vehicle roof on railings disposed along opposing side edge regions of the vehicle roof in a longitudinal direction of the vehicle. The apparatus includes two clamping jaws reciprocally movable in relation to one another under the action of a clamping device in a clamping direction substantially corresponding or parallel to a longitudinal centerline of a load carrier strut with which the two clamping jaws are adapted to be engaged. The clamping device is arranged to lock the two clamping jaws in variable, different or optional positions along a load carrier strut and the two clamping jaws each having a clamping surface for engagement with a railing. A guide portion is connected to the clamping device for displacement along such a load carrier strut and has a guide surface that is disposed for cooperation with a first of the two clamping jaws for moving the first clamping jaw transversely toward and away from such a load carrier strut. A second of the two clamping jaws has a ramp surface extending substantially in the clamping direction at an angle to horizontal. The ramp surface is disposed for cooperation with the first clamping jaw and for displacement of the first clamping jaw transversely of the clamping direction upon mutual relative movement of the first and the second clamping jaws in the clamping direction.

19 Claims, 3 Drawing Sheets

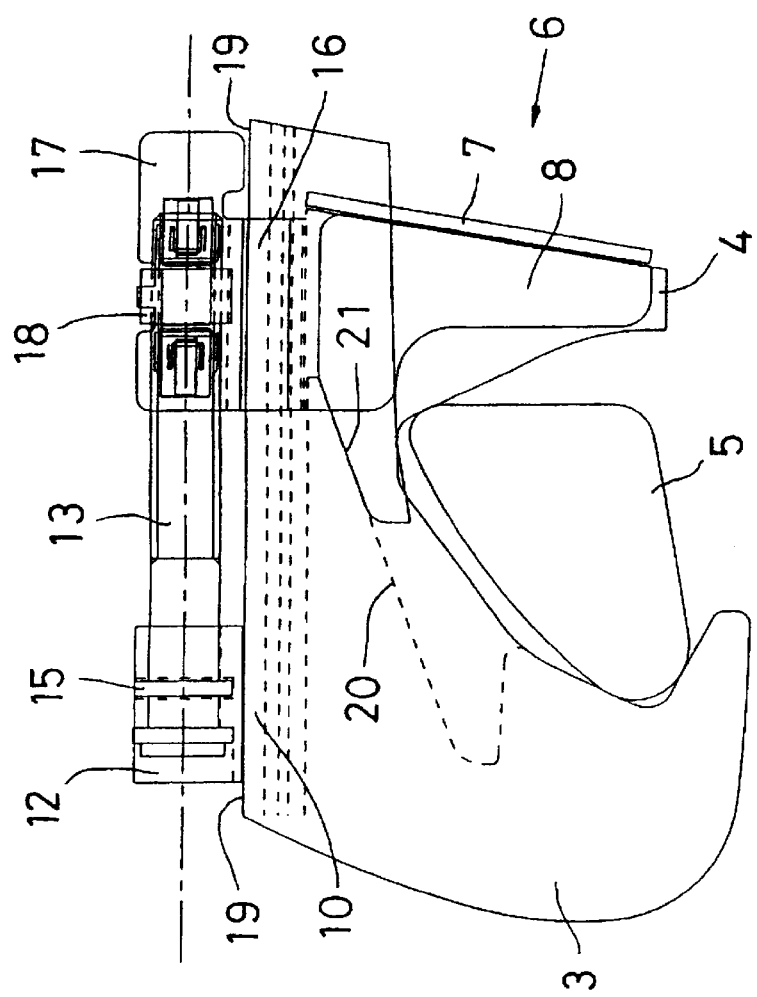
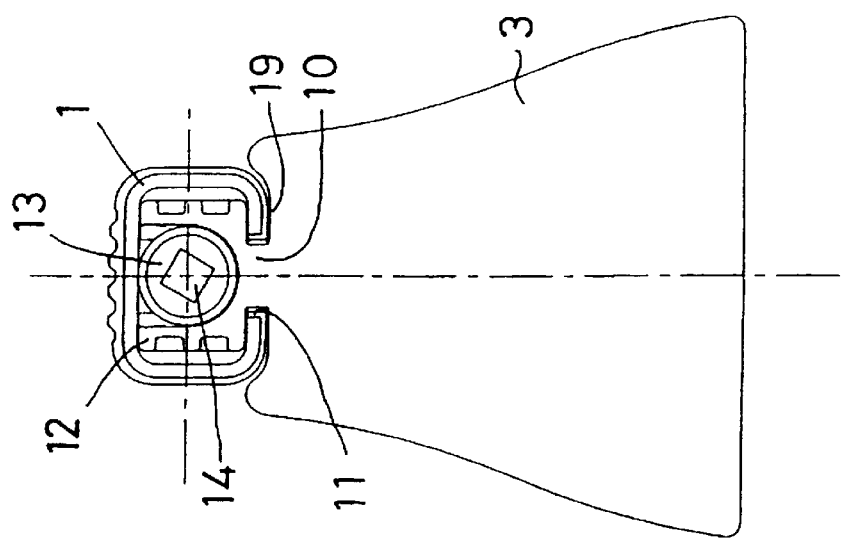

RAILING BRACKET

RELATED PATENT APPLICATIONS

This is a continuation patent application of International Application Number PCT/SE97/01414 filed Aug. 27, 1997 that designates the United States. The full disclosure of said application in its entirety is hereby expressly incorporated by reference into the present application.

DESCRIPTION

Technical Field

The present invention relates to an apparatus for securing a load carrier strut, extending transversely over a vehicle roof, on so-called railings that are disposed along opposing side edge regions of the vehicle roof and in the longitudinal direction of the vehicle. The apparatus includes two clamping jaws reciprocally movable in relation to one another along the load carrier strut under the action of a clamping device. The clamping jaws have clamping surfaces for engagement with the railing and the clamping device is designed for locking the clamping jaws in optional positions along the load carrier strut.

BACKGROUND OF THE INVENTION

A railing bracket of the type mentioned by way of introduction is disclosed in WO94/21490. This railing bracket has two clamping jaws which are displaceable in the longitudinal direction of a load carrier strut both together along the load carrier strut and mutually in relation to one another. Inside the load carrier strut is disposed an operating device for the movement and locking of the clamping jaws.

The clamping jaws have mutually facing clamping surfaces for cooperation with a railing bar. These clamping surfaces incline in relation to the normal to the longitudinal direction of the load carrier strut so that the lower ends of the clamping surfaces are located considerably closer to one another than their upper ends. The clamping surfaces are substantially straight.

A railing bracket of this type may be employed on railing profiles of varying cross sections, since the aperture which the two clamping surfaces together define is powerfully undercut. However, there is the serious drawback that, if the bracket is applied on a railing profile of slight cross section (e.g. a slim tube), the load carrier strut will be located very close to the upper side of the railing while, on the other hand, the distance will be considerably greater if the bracket is applied on a railing profile of larger cross section.

EP 0 503 305 A1 shows a railing bracket of approximately the same fundamental type as that mentioned by way of introduction. However, this railing bracket is designed in such a manner that it may only be employed together with a single railing profile type.

In view of the above described deficiencies associated with the use of known designs for load carrier railing brackets, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed load carrier railing brackets and incorporates several additionally beneficial features. The present invention has for one of its object to design a railing bracket as is intimated by way of introduction such that it will be universally applicable, substantially regardless of the configuration of the cross section of the railing, and also its size. The present invention also has for its object to realize a railing bracket in which the position of the load carrier strut in the vertical direction varies as slightly as possible regardless of the size of the cross sectional configuration of the railing profile. The present invention further yet has for its object to realize a railing bracket which is simple and economical to manufacture and which affords reliable function and simple operation.

The objects forming the basis of the present invention will be attained if the construction intimated by way of introduction is characterized by a guide portion which, for its displacement along the load carrier strut, is connected to the clamping device, and which has guide surfaces for cooperation with the one clamping jaw so that this is movable transversely of the load carrier strut towards and away from the strut.

In at least one embodiment, the present invention takes the form of an apparatus or bracket for securing a load carrier strut that extends transversely over a vehicle roof on railings disposed along opposing side edge regions of the vehicle roof in a longitudinal direction of the vehicle. The apparatus includes two clamping jaws reciprocally movable in relation to one another under the action of a clamping device in a clamping direction substantially corresponding or parallel to a longitudinal centerline of a load carrier strut with which the two clamping jaws are adapted to be engaged. The clamping device is arranged to lock the two clamping jaws in variable, different or optional positions along a load carrier strut and the two clamping jaws each having a clamping surface for engagement with a railing. A guide portion is connected to the clamping device for displacement along such a load carrier strut and has a guide surface that is disposed for cooperation with a first of the two clamping jaws for moving the first clamping jaw transversely toward and away from such a load carrier strut. In this embodiment of the invention, it is specifically contemplated that the load carrier strut is not structurally included, but instead, connection thereto is accommodated.

In another embodiment, the invention does include a load carrier strut that is arranged for extension transversely over a vehicle roof. In yet another embodiment, the carrying vehicle and roof railings are also included and described herein thereby clearly defining the relationship of the several newly designed components of the invention in combination with more standard components. The clamping surfaces are configured to define therebetween an accommodation space for a railing, the accommodation space being substantially triangular, with an apex of the substantially triangular accommodation space being directed upward.

In at least one embodiment of the invention, a second of the two clamping jaws has a ramp surface extending substantially in the clamping direction at an angle to horizontal. The ramp surface is disposed for cooperation with the first clamping jaw and for displacement of the first clamping jaw transversely of the clamping direction upon mutual relative movement of the first and the second clamping jaws in the clamping direction.

An end of the ramp surface facing the first clamping jaw is located more proximal the load carrier strut than an opposite end of the ramp surface. Furthermore, this may be appreciated as an upper end of the ramp surface extending in a direction toward the first clamping jaw and the upper end of the ramp surface is oriented for more proximal location to the load carrier strut than a lower end of the ramp surface. The angle between the ramp surface and the clamping direction lies in a range of 10° to 35° and is preferably approximately 20°.

The guide portion is approximately U-shaped in a horizontal cross section taken substantially perpendicular to the clamping direction, a bottom of the U-shape forms a support surface against which the first clamping jaw abuts and is slidable upon tightening of the first and second clamping jaws toward one another. The support surface is substantially obliquely inclined in relation to normal to the clamping direction so that a lower end of the support surface is located more distal from a longitudinal center line of a carrying vehicle of the apparatus than is an upper end of the support surface. The guide portion and the first clamping jaw are interconnected and each of the guide portion and the first clamping jaw have mutually engaging guides arranged for directing sliding movement of the first clamping jaw along the support surface.

An anchorage mechanism is included for securing the first clamping jaw to the support surface in variable positions along a length of the support surface.

The clamping device has a screw axially fixed and rotatable with respect to one of the two clamping jaws and a nut in mesh with the screw. The nut is connected to the other of the two clamping jaws. As illustrated, the nut is secured in the guide portion.

The clamping device is disposed interiorly in the load carrier strut. To accommodate this relationship, the second clamping jaw and the guide portion each have a neck portion and each of the neck portions are located in an elongate aperture in a lower defining wall of the load carrier strut.

The beneficial effects described above apply generally to the exemplary devices and mechanisms disclosed herein of the railing bracket assemblies. The specific structures through which these benefits are delivered will be described in detail hereinbelow.

BRIEF DESCRIPTION OF THE DRAWINGS

The invention will now be described in greater detail in the following way of example only and with reference to the attached drawings, in which:

FIG. 2 shows the railing bracket according to FIG. 1, seen from the end of the load carrier strut, the security endpiece of the load carrier strut having however been removed;

FIG. 3 is a view in the same direction as that of FIG. 1 with a railing profile intimated and the load carrier strut removed;

MODE(S) FOR CARRYING OUT THE INVENTION

Figure 1:
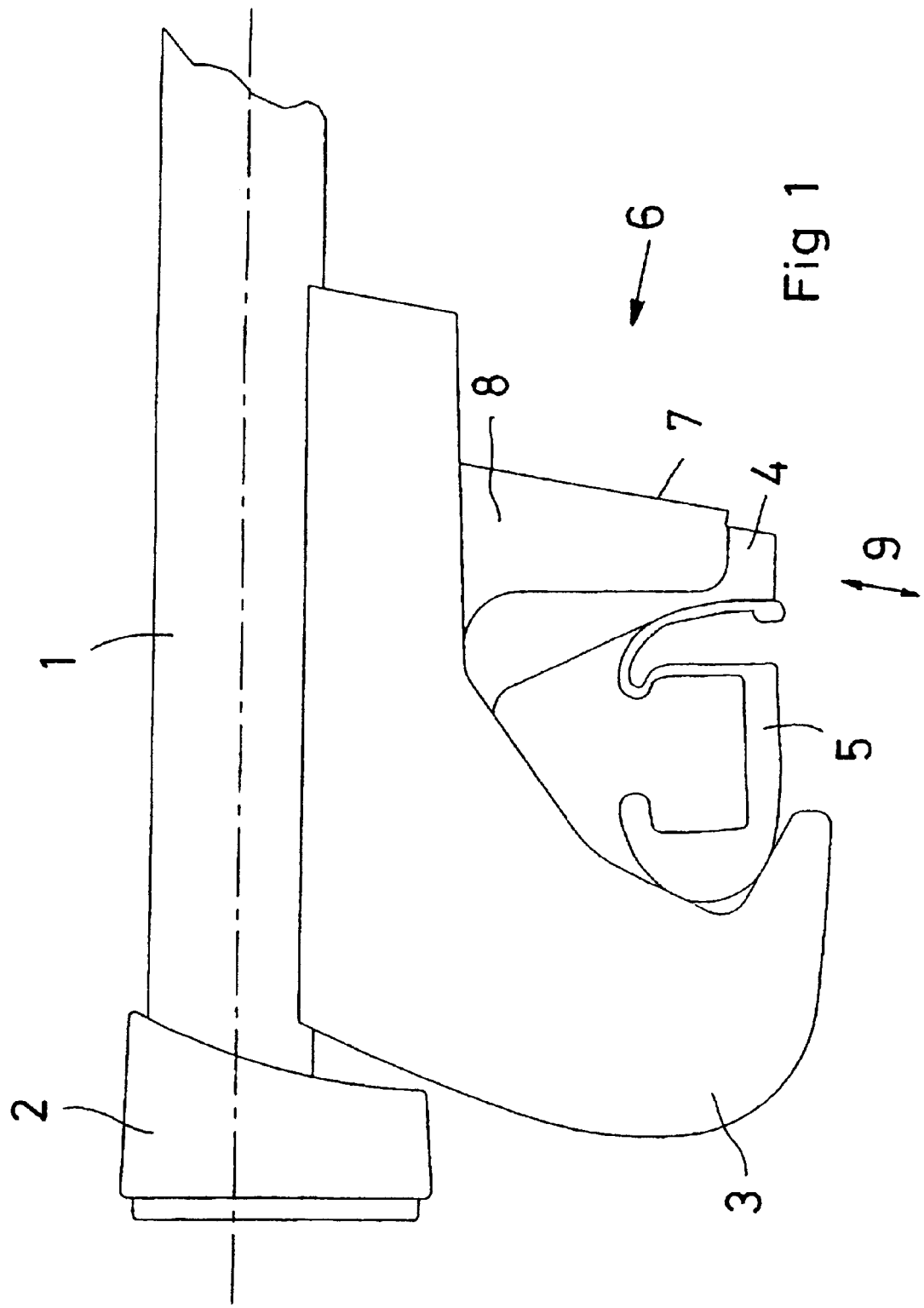
FIG. 1 is a vertical side elevation of the railing bracket with a portion of a load carrier strut, seen in the longitudinal direction of a vehicle.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Referring to the figures, a load carrier strut 1 is shown which is intended to be secured on railings 5 which are disposed longitudinally at opposing side edge regions of a carrying vehicle. In such instance, the load carrier strut 1 is transversely directed in relation to the longitudinal direction of the vehicle and extends over the railings 5 and the roof of the vehicle. The load carrier strut 1 has an endpiece 2 which, while not being apparent from the figures, may include a lock and also an operating device for operating the clamping device that will be described in greater detail hereinbelow.

The bracket includes two mutually reciprocal clamping jaws 3 and 4, in which the clamping jaw 3 may be considered as the outer clamping jaw 3, and the clamping jaw 4 as the inner clamping jaw 4. The clamping jaws 3,4 are also jointly movable along the load carrier strut 1 and have portions which extend into the load carrier strut 1 via a slot-shaped aperture 11 (as seen in FIG. 2) provided in the underside of the strut 1. Reference numeral 5 intimates in FIG. 1 the cross-sectional configuration of the longitudinal railing bar, and it will be apparent that this cross-sectional configuration is complicated, having an upwardly open undercut recess and a cross-sectional configuration which may be described as approximately oval.

The bracket according to FIG. 1 further includes a guide portion 6 which is connected to a clamping device which will be described in grater detail below, and which is located interiorly in the load carrier strut 1. In horizontal section, the guide portion 6 is approximately U-shaped, where the bottom surface of the U-shape forms a support surface 7 for the inner clamping jaw 4. The clamping jaw 4 is movable in the vertical direction towards and away from the load carrier strut 1 in a direction which is transverse to the strut 1, but which suitably deviates somewhat from the normal. For this reason, the support surface 7 is somewhat obliquely inclined so that its lower surface is located more distally from the longitudinal center line of the vehicle than its upper end. The inner clamping jaw 4 is further guided in the lateral direction (in the longitudinal direction of the vehicle) by being accommodated between the approximately parallel shanks 8 of the U-shaped cross section. The arrow 9 in FIG. 1 illustrates the two-directional movement capability of the inner clamping jaw 4 in relation to the guide portion 6.

FIG. 2 shows the bracket as seen in a longitudinal direction of the load carrier strut 1 looking in towards the longitudinal center line of the carrying vehicle. It will be apparent from the Figure that the outer clamping jaw 3 has a narrow neck portion 10 which extends through the slot-shaped aperture 11 in the underside of the load carrier strut 1. Above the neck portion 10, the outer clamping jaw 3 has an anchorage 12 for a screw 13 (see also FIG. 3). At its end, the screw 13 has engagement means 14 to be able to be rotated under the action of a suitable torque tool. The engagement means 14 may ideally be designed as a channel extending along the screw and being of non-rotational symmetric cross section. In FIG. 2, a square cross section is shown, but this could just as well be, for example, hexagonal. In the embodiment illustrated in FIG. 2, a square rod functions as the torque tool, this being insertable in the aperture 14 and being secured in the endpiece 2 (see FIG. 1).

The screw 13 is rotatable in relation to the anchorage 12 but is axially fixed therein by having at least one projecting flange 15 which is accommodated in a corresponding groove in the anchorage, the groove being transversely directed in relation to the longitudinal direction of the screw.

It will be apparent from FIG. 3 that the guide portion 6 has a neck portion 16 corresponding to the neck portion 10 of the outer clamping jaw 3. This neck portion 16 also extends up through the slot-shaped aperture 11 in the underside of the load carrier strut 1. Interiorly in the load carrier strut 1, the guide portion 6 has two registering plates 17 which, in the vertical direction, abut against corresponding defining surfaces in the load carrier strut 1. Hereby, the guide portion 6 will be displaceable in a sliding guide in relation to the load carrier strut 1. The plates 17 also serve as an anchorage for a nut 18 which meshes or matingly engages with the screw 13. The nut 18 is fixed in relation to the plates 17 in the longitudinal direction of the screw 13 and is non-rotatably secured between the two opposing plates 17.

The anchorage 12, the screw 13, the nut 18 and the two plates 17 may be considered as a clamping device whose purpose is to reciprocally displace the two clamping jaws 3 and 4 so that a railing bar 5 may be fixedly clamped between them. In an open state, the clamping device also allows both of the jaws 3,4 to be jointly slid in the longitudinal direction of the load carrier strut 1.

It is apparent when referring to both FIGS. 1 and 3 that the outer clamping jaw 3 has, in the longitudinal direction of the load carrier strut 1, a long, upper support surface 19 for the load carrier strut 1. On the other hand, the guide portion 6 has, in the longitudinal direction of the load carrier strut 1, a short contact surface against the load carrier strut 1. On tightening of the clamping device, this implies that the guide portion 6 will be obliquely inclined somewhat in relation to the load carrier strut 1 and will be clamped against the strut by a "jammed drawer effect". In order to reinforce this clamping action, the support portion may, on its upper side, have grooves or projections which improve engagement with the underside of the load carrier strut 1.

As was mentioned above, the inner clamping jaw 4 is movable in the vertical direction in relation to the guide portion 6. In order to realize such vertical movement, the outer clamping jaw 3 has a ramp surface 20 which is intended for cooperation with an obliquely inclined surface 21 on the inner clamping jaw 4. In their cooperation position, the ramp surface 20 and the obliquely inclined surface 21 lie against one another and are parallel. The ramp surface 20 makes an acute angle with the longitudinal direction of the load carrier strut 1 and is located more proximal the load carrier strut 1 at its end facing towards the inner clamping jaw 4 than is the case at its end facing away from the inner clamping jaw 4. The angle between the ramp surface 20 and the longitudinal direction of the load carrier strut lies in the range of 10 to 35° and may, in one preferred embodiment, be approximately 20°.

Figure 4:
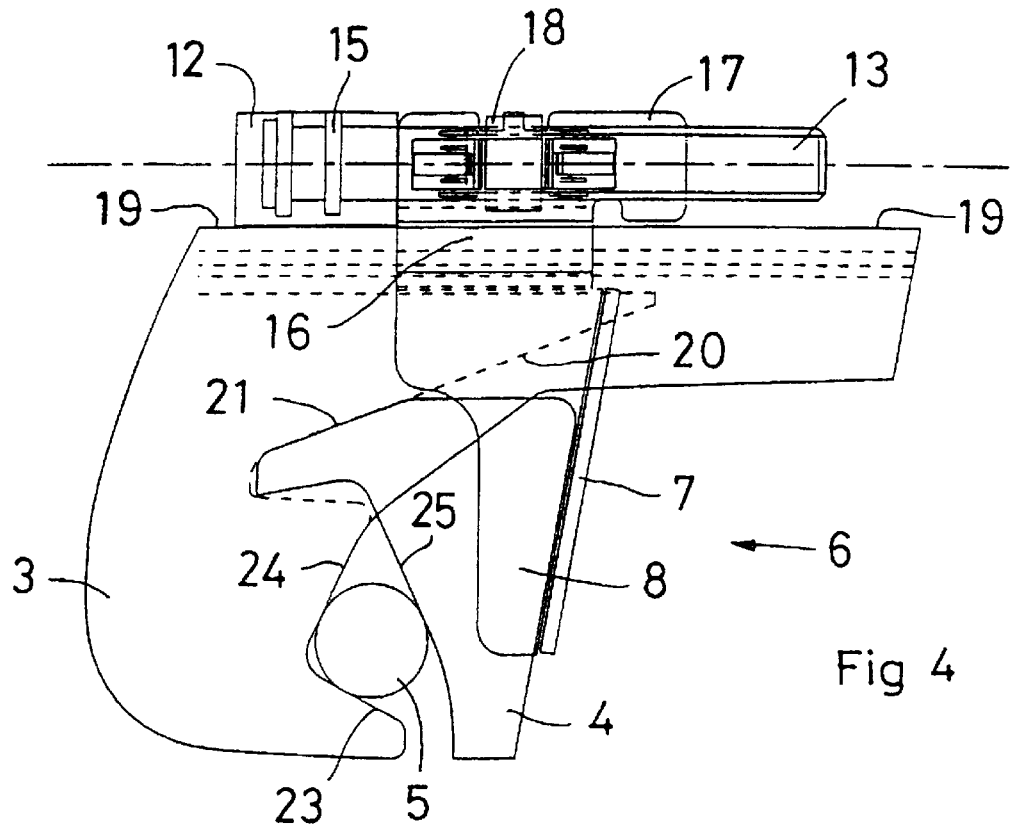
FIG. 4 is a view corresponding to that of FIG. 3 in which the railing bar is of circular cross section and slight diameter.

As a result of the above described oblique inclination of the ramp surface 20, the inner clamping jaw 4 will be displaced in a downward direction when the clamping jaws 3 and 4 are moved towards one another. This is clearly illustrated by FIGS. 4 and 5 where the bracket is applied on a slim, cylindrical railing in FIG. 4 and a thick, cylindrical railing bar in FIG. 5. In FIG. 4, the lower end of the inner clamping jaw 4 lies in the same vertical position as the lower end of the outer clamping jaw 3. On the other hand, in FIG. 5, the inner clamping jaw 4 is located higher than the lower end of the outer clamping jaw 3. This is clearly apparent from the broken line 22.

Figure 5:
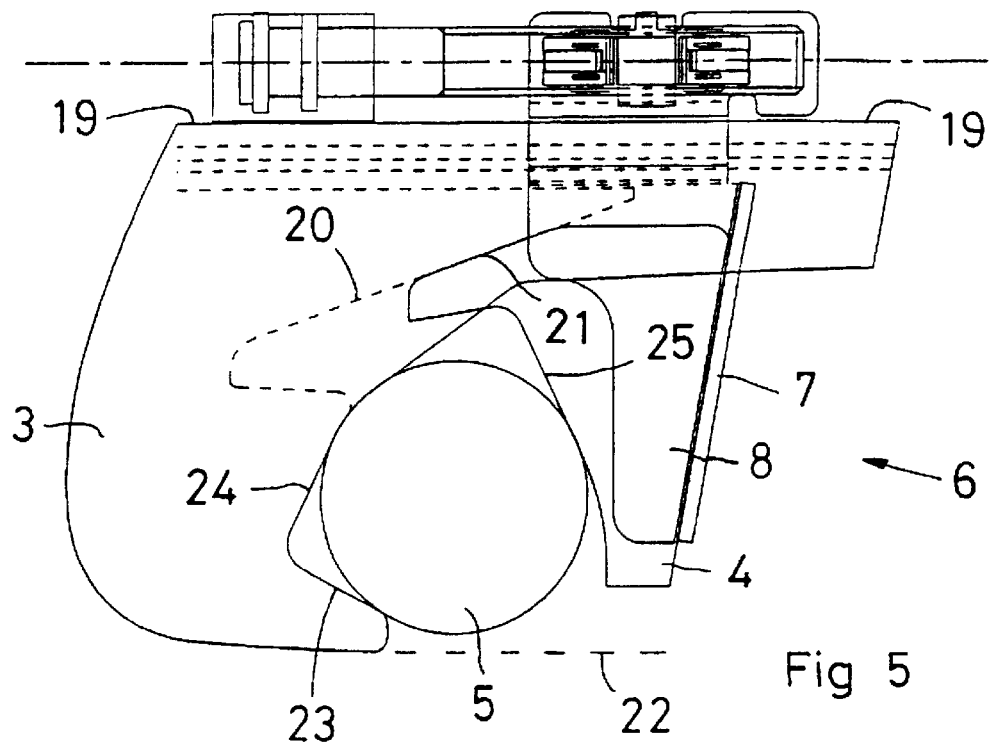
FIG. 5 is a view corresponding to that of FIG. 4 in which the railing bar is of circular cross section and with greater diameter.

It will be particularly apparent from FIGS. 4 and 5 that the two clamping jaws have mutually facing clamping surfaces which, together, form an accommodation space for the railing bar. This accommodation space may be generally described as approximately triangular in cross section, the apex of the triangle being turned to face upwards.

The clamping surface of the outer clamping jaw 3 includes a lower portion 23 which serves the function of a base in the above-mentioned triangle. This lower portion makes an acute angle with the longitudinal direction of the load carrier strut so that its inner end is located more distally from the load carrier strut than its outer end. The angle may suitably lie in the range of between 10 and 40°. Further, the clamping surface of the outer clamping jaw 3 has an outer portion 24 which is obliquely inclined in relation to the longitudinal direction of the load carrier strut 1. This oblique inclination is such that the outer portion of the clamping surface has a lower end which is located considerably more distal from the longitudinal centerline of the vehicle than the upper end of the clamping surface. The angle between the outer clamping portion or surface 24 and the longitudinal direction of the load carrier strut may lie in the range of between 40 and 70°. The inner clamping jaw 4 also has a clamping surface 25 which makes an angle with the longitudinal direction of the load carrier strut 1. The inner clamping surface 25 is obliquely inclined in such a manner that its upper portion is located more distal from a longitudinal centerline of the vehicle than its lower end. The angle between the clamping surface 25 and the longitudinal direction of the load carrier strut may lie in the range of between 40 and 75°.

In the Figures, the outer portion 24 of the clamping surface of the outer clamping jaw 3 is either arched or divided into different part surfaces which make an angle with one another. In this instance, the upper part surface is "slightly more horizontal" than the lower part surface.

While not being apparent from the Figures, the guide portion 6 may be provided with a clamping device or locking device by means of which the inner clamping jaw 4 may be secured at any optional vertical height in relation to the guide portion.

A further alternative resides in the fact that one of the inner jaw 4 or the guide portion 6 is provided with grooves which are parallel with the support surface 7, while the guide portion or jaw, respectively, has projections which snap into the grooves. The inner jaw 4 is hereby slidable along the guide or support surface 7, at the same time as the inner jaw 4 is interconnected with the guide portion 6.

A railing bracket and its components have been described herein. These and other variations which will be appreciated by those skilled in the art are within the intended scope of this invention as claimed below. As previously stated, detailed embodiments of the present invention are disclosed herein; however, it is to be understood that the disclosed embodiments are merely exemplary of the invention that may be embodied in various forms.

Industrial Applicability

The present invention finds applicability in the vehicular load carrier industries.

What is claimed and desired to be secured by Letters Patent is as follows:

1. An apparatus for securing a load carrier strut that extends transversely over a vehicle roof on railings disposed along opposing side edge regions of the vehicle roof in a longitudinal direction of the vehicle, said apparatus comprising:

two clamping jaws reciprocally movable in relation to one another under the action of a clamping device in a clamping direction substantially corresponding to a longitudinal centerline of a load carrier strut with which said two clamping jaws are adapted to be engaged, said clamping device being arranged to lock said two clamping jaws in variable positions along a load carrier strut and said two clamping jaws each having a clamping surface for engagement with a railing; and a guide portion connected to said clamping device for displacement along a load carrier strut, said guide portion having a guide surface disposed for cooperation with a first of said two clamping jaws for moving said first clamping jaw transversely toward and away from such a load carrier strut.

2. An apparatus for securing a load carrier strut that extends transversely over a vehicle roof on railings disposed along opposing side edge regions of the vehicle roof in a longitudinal direction of the vehicle, said apparatus comprising:

two clamping jaws reciprocally movable in relation to one another under the action of a clamping device in a clamping direction substantially corresponding to a longitudinal centerline of a load carrier strut with which said two clamping jaws are adapted to be engaged, said clamping device being arranged to lock said two clamping jaws in variable positions along a load carrier strut and said two clamping jaws each having a clamping surface for engagement with a railing;

a guide portion connected to said clamping device for displacement along a load carrier strut, said guide portion having a guide surface disposed for cooperation with a first of said two clamping jaws for moving said first clamping jaw transversely toward and away from such a load carrier strut; and a second of said two clamping jaws has a ramp surface extending substantially in said clamping direction at an angle to horizontal, said ramp surface being disposed for cooperation with said first clamping jaw and for displacement of said first clamping jaw transversely of said clamping direction upon mutual relative movement of said first and said second clamping jaws in the clamping direction.

3. The apparatus as recited in claim 2, wherein an end of said ramp surface facing said first clamping jaw is located more proximal such a load carrier strut than an opposite end of said ramp surface.

4. The apparatus as recited in claim 2, wherein an upper end of said ramp surface extends in a direction toward said first clamping jaw and said upper end of said ramp surface is oriented for more proximal location to such a load carrier strut than a lower end of said ramp surface.

5. The apparatus as recited in claim 2, wherein an angle between said ramp surface and said clamping direction lies in a range of 10° to 35°.

6. The apparatus as recited in claim 5, wherein said angle between said ramp surface and said clamping direction is approximately 20°.

7. An apparatus for securing a load carrier strut that extends transversely over a vehicle roof on railings disposed along opposing side edge regions of the vehicle roof in a longitudinal direction of the vehicle, said apparatus comprising:

two clamping jaws reciprocally movable in relation to one another under the action of a clamping device in a clamping direction substantially corresponding to a longitudinal centerline of a load carrier strut with which said two clamping jaws are adapted to be engaged, said clamping device being arranged to lock said two clamping jaws in variable positions along a load carrier strut and said two clamping jaws each having a clamping surface for engagement with a railing;

a guide portion connected to said clamping device for displacement along a load carrier strut, said guide portion having a guide surface disposed for cooperation with a first of said two clamping jaws for moving said first clamping jaw transversely toward and away from such a load carrier strut; and said guide portion is approximately U-shaped in a horizontal cross section taken substantially perpendicular to said clamping direction, a bottom of said U-shape forms a support surface against which said first clamping jaw abuts and is slidable upon tightening of said first and second clamping jaws toward one another.

8. The apparatus as recited in claim 7, wherein said support surface is substantially obliquely inclined with respect to vertical so that a lower end of said support surface is located more distal from a longitudinal center line of a carrying vehicle of the apparatus than is an upper end of said support surface.

9. The apparatus as recited in claim 8, further comprising:
an anchorage mechanism for securing said first clamping jaw to said support surface in variable positions along a length of said support surface.

10. The apparatus as recited in claim 7, further comprising:
an anchorage mechanism for securing said first clamping jaw to said support surface in variable positions along a length of said support surface.

11. The apparatus as recited in claim 7, further comprising:
said guide portion and said first clamping jaw are interconnected and each of said guide portion and said first clamping jaw have mutually engaging guides arranged for directing sliding movement of said first clamping jaw along said support surface.

12. An apparatus for securing a load carrier strut that extends transversely over a vehicle roof on railings disposed along opposing side edge regions of the vehicle roof in a longitudinal direction of the vehicle, said apparatus comprising:

two clamping jaws reciprocally movable in relation to one another under the action of a clamping device in a clamping direction substantially corresponding to a longitudinal centerline of a load carrier strut with which said two clamping jaws are adapted to be engaged, said clamping device being arranged to lock said two clamping jaws in variable positions along a load carrier strut and said two clamping jaws each having a clamping surface for engagement with a railing;

a guide portion connected to said clamping device for displacement along a load carrier strut, said guide portion having a guide surface disposed for cooperation with a first of said two clamping jaws for moving said first clamping jaw transversely toward and away from such a load carrier strut;

said clamping device having a screw axially fixed and rotatable with respect to one of said two clamping jaws; and a nut in mesh with said screw, said nut being connected to the other of said two clamping jaws.

13. The apparatus as recited in claim 12, wherein said nut is secured in said guide portion.

14. A load carrier adapted to be mounted upon a transporting vehicle, said load carrier comprising:

- a load carrier strut configured to be transversely positioned over a vehicle roof on railings disposed along opposing side edge regions of the vehicle roof in a longitudinal direction of the vehicle;
- two clamping jaws reciprocally movable in relation to one another under the action of a clamping device in a clamping direction substantially corresponding to a longitudinal centerline of said load carrier strut with which said two clamping jaws are adapted to be engaged, said clamping device being arranged to lock said two clamping jaws in variable positions along said load carrier strut and said two clamping jaws each having a clamping surface for engagement with the railing and said clamping device is disposed interiorly in said load carrier strut; and
- a guide portion connected to said clamping device for displacement along said load carrier strut, said guide portion having a guide surface disposed for cooperation with a first of said two clamping jaws for moving said first clamping jaw transversely toward and away from said load carrier strut.

15. A load carrier adapted to be mounted upon a transporting vehicle, said load carrier comprising:

- a load carrier strut configured to be transversely positioned over a vehicle roof on railings disposed along opposing side edge regions of the vehicle roof in a longitudinal direction of the vehicle;
- two clamping jaws reciprocally movable in relation to one another under the action of a clamping device in a clamping direction substantially corresponding to a longitudinal centerline of said load carrier strut with which said two clamping jaws are adapted to be engaged, said clamping device being arranged to lock said two clamping jaws in variable positions along said load carrier strut and said two clamping jaws each having a clamping surface for engagement with a railing;
- a guide portion connected to said clamping device for displacement along said load carrier strut, said guide portion having a guide surface disposed for cooperation with a first of said two clamping jaws for moving said first clamping jaw transversely toward and away from said load carrier strut;
- said clamping device having a screw axially fixed and rotatable with respect to said second clamping jaw;
- a nut in mesh with said screw, said nut being connected to said first clamping jaw and secured in said guide portion; and
- said second clamping jaw and said guide portion each having a neck portion and each of said neck portions being located in an elongate aperture in a lower defining wall of said load carrier strut.

16. An apparatus for securing a load carrier strut that extends transversely over a vehicle roof on railings disposed along opposing side edge regions of the vehicle roof in a longitudinal direction of the vehicle, said apparatus comprising:

- two clamping jaws reciprocally movable in relation to one another under the action of a clamping device in a clamping direction substantially corresponding to a longitudinal centerline of a load carrier strut with which said two clamping jaws are adapted to be engaged, said clamping device being arranged to lock said two clamping jaws in variable positions along a load carrier strut and said two clamping jaws each having a clamping surface for engagement with a railing;
- a guide portion connected to said clamping device for displacement along a load carrier strut, said guide portion having a guide surface disposed for cooperation with a first of said two clamping jaws for moving said first clamping jaw transversely toward and away from such a load carrier strut; and,
- said clamping surfaces are configured to define therebetween an accommodation space for a railing, said accommodation space being substantially triangular, with an apex of said substantially triangular accommodation space being directed upward.

17. An apparatus for securing a load carrier strut that extends transversely over a vehicle roof on railings disposed along opposing side edge regions of the vehicle roof in a longitudinal direction of the vehicle, said apparatus comprising:

- two clamping jaws, each of said two clamping jaws movable toward and away from the other under the action of a clamping device in a clamping direction substantially corresponding to a longitudinal centerline of a load carrier strut with which said two clamping jaws are adapted to be engaged, said clamping device being arranged to lock said two clamping jaws in variable positions along a load carrier strut and said two clamping jaws each having a clamping surface for engagement with a railing; and
- a guide portion connected to said clamping device for displacement along a load carrier strut, said guide portion having a guide surface disposed for cooperation with a first of said two clamping jaws for moving said first clamping jaw transversely toward and away from such a load carrier strut.

18. An apparatus for securing a load carrier strut that extends transversely over a vehicle roof on railings disposed along opposing side edge regions of the vehicle roof in a longitudinal direction of the vehicle, said apparatus comprising:

- two clamping jaws, each movable in a longitudinal direction of the load carrier strut towards and away from the other for clamping a railing therebetween;
- a clamping device for urging said two clamping jaws one toward the other upon actuation thereof, said clamping device and said two clamping jaws being movable together in the longitudinal direction of the load carrier strut and said clamping device also being arranged, when activated, to lock said two clamping jaws in variable positions along the load carrier strut;
- and a guide portion connected to said clamping device for displacement along a load carrier strut, said guide portion having a guide surface disposed for cooperation with a first of said two clamping jaws for moving said first clamping jaw transversely toward and away from such a load carrier strut.

19. An apparatus for securing a load carrier strut that extends transversely over a vehicle roof on railings disposed along opposing side edge regions of the vehicle roof in a longitudinal direction of the vehicle, said apparatus comprising:

two clamping jaws reciprocally movable in relation to one another along the load carrier strut under the action of a clamping device and said two clamping jaws each having clamping surfaces for engagement with the railing;

said clamping device being adapted for locking said two clamping jaws in optional positions along the load carrier strut;

a guide portion which, for displacement along the load carrier strut, is connected to said clamping device and which has guide surfaces for cooperation with one of said two clamping jaws for accommodating movement of said clamping jaw transversely toward and away from such a load carrier strut.

* * * * *